United States Patent
Hoshino et al.

(10) Patent No.: US 9,847,824 B2
(45) Date of Patent: Dec. 19, 2017

(54) WIRELESS COMMUNICATION METHOD FOR REPORTING MU-CQI OFFSET, USER EQUIPMENT AND ENODE B

(71) Applicant: Panasonic Intellectual Property Corporation of America, Torrance, CA (US)

(72) Inventors: Masayuki Hoshino, Kanagawa (JP); Lilei Wang, Beijing (CN)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 62 days.

(21) Appl. No.: 14/905,257

(22) PCT Filed: Jul. 29, 2013

(86) PCT No.: PCT/CN2013/080327
§ 371 (c)(1),
(2) Date: Jan. 14, 2016

(87) PCT Pub. No.: WO2015/013860
PCT Pub. Date: Feb. 5, 2015

(65) Prior Publication Data
US 2016/0156402 A1    Jun. 2, 2016

(51) Int. Cl.
*H04B 7/06*    (2006.01)
*H04B 7/0452*    (2017.01)
(Continued)

(52) U.S. Cl.
CPC ......... *H04B 7/0632* (2013.01); *H04B 7/0452* (2013.01); *H04B 7/0639* (2013.01); *H04W 28/06* (2013.01); *H04W 76/046* (2013.01)

(58) Field of Classification Search
CPC .. H04B 7/0452; H04B 7/0632; H04B 7/0639; H04W 28/06; H04W 76/046
(Continued)

(56) References Cited

U.S. PATENT DOCUMENTS 8,923,233 B2    12/2014    Ko et al.
2008/0132281 A1    6/2008    Kim et al.
(Continued)

FOREIGN PATENT DOCUMENTS

CN    101610523 A    12/2009
CN    102404081 A    4/2012
(Continued)

OTHER PUBLICATIONS

International Search Report dated Jul. 8, 2014, for corresponding International Application No. PCT/CN2013/080327, 2 pages.
(Continued)

*Primary Examiner* — Michael Neff
(74) *Attorney, Agent, or Firm* — Seed IP Law Group LLP

(57) ABSTRACT

Provided are a wireless communication method based on multiple-user multi-input multi-output (MU-MIMO) and a corresponding user equipment and eNode B. According to the present disclosure, a first MU-CQI offset corresponding to a first co-scheduled PMI which is fully orthogonal with a desired PMI is reported with a larger number of bits than a second MU-CQI offset corresponding to a second co-scheduled PMI which is not fully orthogonal with the desired PMI. Alternatively, a first MU-CQI offset corresponding to a first co-scheduled PMI is reported with a first number of bits, and a second MU-CQI offset corresponding to a second co-scheduled PMI which is correlated with the first co-scheduled PMI is reported with a second smaller number of bits or even not reported. Alternatively, MU-CQI offset(s) corresponding to part of a plurality of co-scheduled PMIs
(Continued)

configured by RRC is/are reported with a series of bits, wherein a first section of the series of bits indicates at least part of the co-scheduled PMI(s) for which the MU-CQI offset is reported, and a second section of the series of bits indicates the reported MU-CQI offset(s).

15 Claims, 6 Drawing Sheets

(51) Int. Cl.
*H04W 28/06* (2009.01)
*H04W 76/04* (2009.01)

(58) Field of Classification Search
USPC ........................................................ 375/267
See application file for complete search history.

(56) References Cited

U.S. PATENT DOCUMENTS

| | | |
|---|---|---|
| 2010/0041390 A1 | 2/2010 | Chen et al. |
| 2012/0320862 A1* | 12/2012 | Ko .................... H04B 7/0417 370/329 |
| 2013/0010888 A1* | 1/2013 | Moulsley ............. H04B 7/063 375/267 |
| 2013/0028225 A1 | 1/2013 | Ko et al. |
| 2013/0176948 A1 | 7/2013 | Tong et al. |
| 2013/0308488 A1 | 11/2013 | Tong et al. |
| 2015/0156000 A1 | 6/2015 | Ko et al. |

FOREIGN PATENT DOCUMENTS

| | | |
|---|---|---|
| CN | 102934370 A | 2/2013 |
| WO | 2012/031422 A1 | 3/2012 |
| WO | 2012/058825 A1 | 5/2012 |
| WO | 2012/129803 A1 | 10/2012 |

OTHER PUBLICATIONS

Qualcomm Incorporated, "Details of MU-CSI feedback," R1-132484, 3GPP TSG-RAN WG1 #73, Agenda Item: 6.2.2.2, Fukuoka, Japan, May 20-24, 2013, 6 pages.

\* cited by examiner

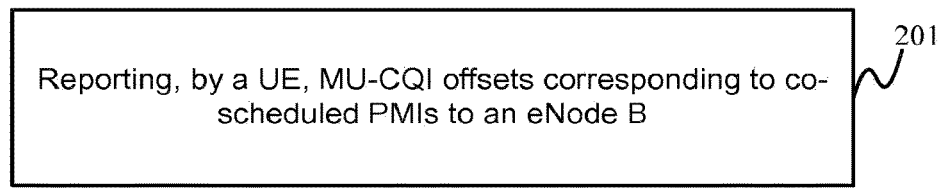
Fig. 2A
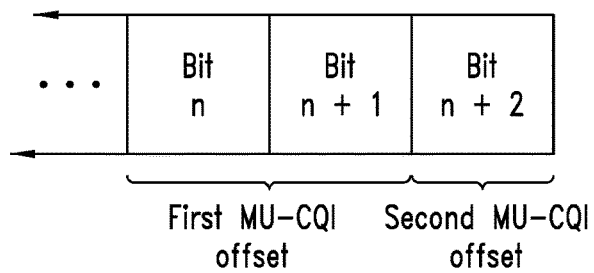
Fig. 2B
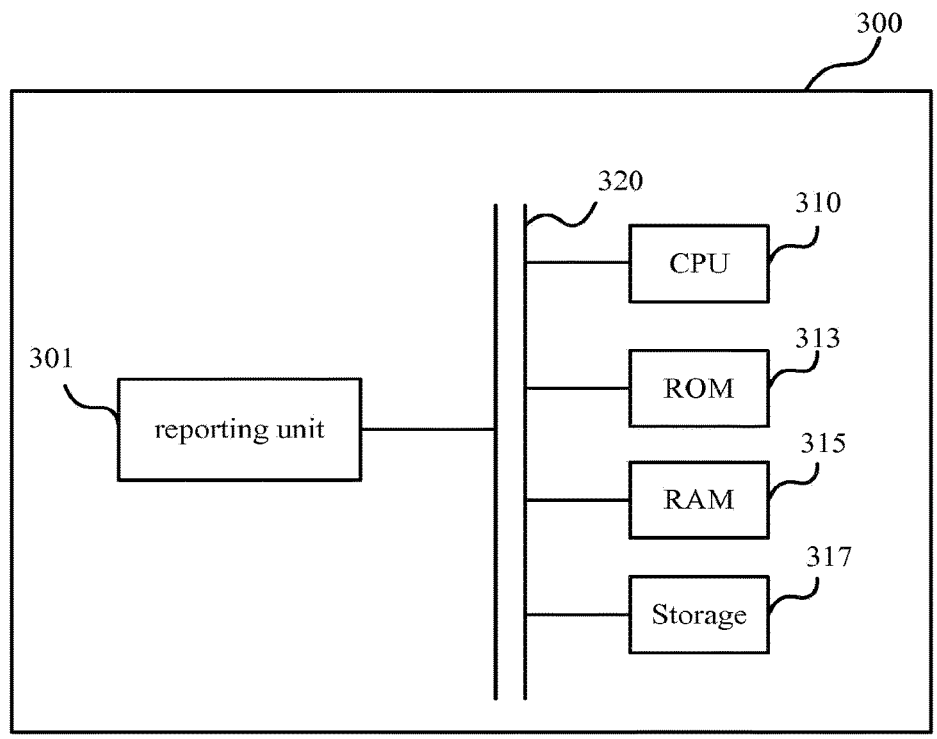
Fig. 3

WIRELESS COMMUNICATION METHOD FOR REPORTING MU-CQI OFFSET, USER EQUIPMENT AND ENODE B

TECHNICAL FIELD

The present disclosure relates to the field of wireless communication, and in particular, to a wireless communication method for reporting multiple-user channel quality indicator (MU-CQI) offset, a user equipment and an eNode B.

BACKGROUND

MU-MIMO (multiple-user multi-input multi-output) is a kind of spatial multiplexing technology in physical layer of LTE (Long Term Evolution) and supports multiple users simultaneously in a cell. Current standard releases (Rel. 8-11) already support MU-MIMO, but in a kind of transparent way. An eNode B flexibly performs switching/scheduling between SU-MIMO (single-user MIMO) and MU-MIMO. Furthermore, there is no any enhancement on MU CSI (channel status indicator) calculation since current assumption on CSI calculation is SU-MIMO. The problem of such behavior is that eNode B cannot know accurate CSI information on MU so that MU performance will be degraded due to inaccuracy of MU paring and scheduling.

Such issue is now being investigated in eMIMO session (Further Downlink MIMO Enhancement for LTE-Advanced) in Rel.12 standardization meetings. However, there is no agreement so far. From contributions submitted to the latest several RAN1 meetings (e.g., 3GPP RAN1 #73), there are four types of options as follows:

[Option 1] Introducing a MU-CQI (multiple-user channel quality indicator) offset while a co-scheduled PMI hypothesis is configured by RRC(radio resource control);
[Option 2] Introducing RRC signaling for each CSI process about SU or MU assumption;
[Option 3] Introducing a well defined CSI-IM (CSI interference measurement) measurement interval by a measurement averaging window;
[Option 4] No enhancement for MU (i.e. standard transparent approach by utilizing CSI-IM+rank restriction).

Compared to Options 2-4, Option 1 is supposed to get the best performance as UE can feedback accurate MU CSI information.

The idea of Option 1 (see R1-132484 submitted to 3GPP RAN1 #73, which is incorporated herein by reference) is that UE feedbacks (report) multiple MU-CQI offsets based on co-scheduled PMI (precoding matrix indicator) assumptions. Herein, the co-scheduled PMI is the possible PMI for a possibly co-scheduled UE, which is configured by RRC. The MU-CQI offset is a CQI offset (usually degradation) when introducing a certain co-scheduled PMI relative to the CQI for a desired PMI. The desired PMI is the best PMI that the target UE selects. The co-scheduled PMI assumptions are configured by RRC, as shown in following Table 1.

TABLE 1

| Co-scheduled PMI assumptions (K = 5) - from R1-132484 | |
| --- | --- |
| Desired PMI | Co-scheduled PMI |
| 0 | {1, 2, 3, 8, 10} |
| 1 | {0, 2, 3, 9, 11} |
| 2 | {0, 1, 3, 8, 10} |

TABLE 1-continued

| Co-scheduled PMI assumptions (K = 5) - from R1-132484 | |
| --- | --- |
| Desired PMI | Co-scheduled PMI |
| 3 | {0, 1, 2, 9, 11} |
| 4 | {6, 5, 7, 2, 3} |
| 5 | {7, 4, 6, 0, 3} |
| 6 | {4, 7, 5, 0, 1} |
| 7 | {5, 6, 4, 1, 2} |
| 8 | {0, 2, 9, 10, 11} |
| 9 | {1, 3, 8, 10, 11} |
| 10 | {0, 2, 8, 9, 11} |
| 11 | {1, 3, 8, 9, 10} |
| 12 | {13, 14, 15, 5, 6} |
| 13 | {12, 14, 15, 4, 7} |
| 14 | {12, 13, 15, 4, 7} |
| 15 | {12, 13, 14, 5, 6} |

Table 1 assumes the number of co-scheduled PMIs (K) is 5. As seen from Table 1, if the desired PMI index is 0, the co-scheduled PMI index is 1, 2, 3, 8 and 10; if the desired PMI index is 1, the co-scheduled PMI index is 0, 2, 3, 9 and 11, and so on. The MU-CQI offset is calculated corresponding to each co-scheduled PMI assumption. The feedback of the MU-CQI offset relies on a differential CQI table, which needs 2 bits, as shown in Table 2 below.

TABLE 2

| Differential CQI table | |
| --- | --- |
| Subband differential CQI value | Offset level (dB) |
| 0 | 0 |
| 1 | 1 |
| 2 | ≥2 |
| 3 | ≤−1 |

In Table 2, the offset level of the MU-CQI offset can be indicated by 2 bits. The value (subband differential CQI value) of the 2 bits is listed in the left column of the table, and the corresponding offset level is listed in the right column of the table. For example, if the value of the 2 bits is 0, that is, the 2 bits are "00", then the offset level is 0 dB, which means that there is no offset between the CQI with a co-scheduled PMI and the CQI for a desired PMI. If the value of the 2 bits is 3, that is, the 2 bits are "11", then the offset level is "≤−1 dB", which means that the CQI with a co-scheduled PMI is smaller than the CQI for a desired PMI by more than 1 dB.

FIG. 1 illustrates an exemplary communication system supporting MU-MIMO for MU-CQI offset feedback, in which there are one eNode B (eNB), one target UE and two possibly co-scheduled UEs. For this system, the target UE reports one CQI for the desired PMI and also reports two CQI offsets 1 and 2 respectively for two possibly co-scheduled PMIs 1 and 2.

The problem of Option 1 above is that the overhead is very large especially if the number of co-scheduled PMIs is large. For example, if the number of co-scheduled PMIs is 5, 10 bits for 5 MU-CQI offsets are needed as each MU-CQI offset needs 2 bits based on the differential CQI table. If the number of co-scheduled PMIs is 10, then 20 bits for 10 MU-CQI offsets are needed.

SUMMARY OF THE DISCLOSURE

The present disclosure is made in view of the above in order to reduce the overhead for reporting MU-CQI offsets without losing performance too much.

In a first aspect of the present disclosure, there is provided a wireless communication method based on multiple-user multi-input multi-output (MU-MIMO), comprising a step of reporting, by a user equipment (UE), multiple-user channel quality indicator (MU-CQI) offsets corresponding to co-scheduled precoding matrix indicators (PMI) to an eNode B, wherein a first MU-CQI offset corresponding to a first co-scheduled PMI which is fully orthogonal with a desired PMI being reported with a first number of bits, a second MU-CQI offset corresponding to a second co-scheduled PMI which is not fully orthogonal with the desired PMI being reported with a second number of bits, and the second number being smaller than the first number. Preferably, the first number is 2, and the second number is 1.

In a second aspect of the present disclosure, there is provided a wireless communication method based on multiple-user multi-input multi-output (MU-MIMO), comprising a step of reporting, by a user equipment (UE), multiple-user channel quality indicator (MU-CQI) offsets corresponding to co-scheduled precoding matrix indicators (PMI) to an eNode B, wherein a first MU-CQI offset corresponding to a first co-scheduled PMI being reported with a first number of bits, a second MU-CQI offset corresponding to a second co-scheduled PMI which is correlated with the first co-scheduled PMI being reported with a second number of bits or not reported, and the second number being smaller than the first number. Preferably, the first number is 2, and the second number is 1.

In a third aspect of the present disclosure, there is provided a wireless communication method based on multiple user multi-input multi-output (MU-MIMO), comprising a step of reporting, by a user equipment (UE), multiple-user channel quality indicator (MU-CQI) offset(s) corresponding to part of a plurality of co-scheduled precoding matrix indicators (PMI) configured by radio resource control (RRC) to an eNode B with a series of bits, wherein a first section of the series of bits indicating at least part of the co-scheduled PMI(s) for which the MU-CQI offset is reported, and a second section of the series of bits indicating the reported MU-CQI offset(s).

In one example of the third aspect, the best MU-CQI offset among the MU-CQI offsets corresponding to the plurality of co-scheduled PMIs configured by RRC and the indication of its corresponding co-scheduled PMI are reported with the series of bits.

In the one example of the third aspect, preferably, the worst MU-CQI offset among the MU-CQI offsets corresponding to the plurality of co-scheduled PMIs configured by RRC and the indication of its corresponding co-scheduled PMI are also reported with the series of bits.

In the one example of the third aspect, preferably, a MU-CQI offset corresponding to a randomly selected co-scheduled PMI is also reported with the series of bits.

In the one example of the third aspect, preferably, a MU-CQI offset corresponding to a cyclically selected co-scheduled PMI other than the co-scheduled PMI related with the best MU-CQI offset is also reported with the series of bits. Further preferably, the cyclically selected co-scheduled PMI is cyclically selected for subbands.

In the one example of the third aspect, preferably, only the best MU-CQI offset and the indication of its corresponding co-scheduled PMI are reported if the best MU-CQI offset is not better than the worst offset level defined in a MU-CQI offset table used for the reporting.

In a fourth aspect of the present disclosure, there is provided a user equipment (UE) supporting multiple-user multi-input multi-output (MU-MIMO), comprising a reporting unit configured to report multiple-user channel quality indicator (MU-CQI) offsets corresponding to co-scheduled precoding matrix indicators (PMI) to an eNode B, wherein a first MU-CQI offset corresponding to a first co-scheduled PMI which is fully orthogonal with a desired PMI being reported with a first number of bits, a second MU-CQI offset corresponding to a second co-scheduled PMI which is not fully orthogonal with the desired PMI being reported with a second number of bits, and the second number being smaller than the first number.

In a fifth aspect of the present disclosure, there is provided a user equipment (UE) supporting multiple-user multi-input multi-output (MU-MIMO), comprising a reporting unit configured to report multiple-user channel quality indicator (MU-CQI) offsets corresponding to co-scheduled precoding matrix indicators (PMI) to an eNode B, wherein a first MU-CQI offset corresponding to a first co-scheduled PMI being reported with a first number of bits, a second MU-CQI offset corresponding to a second co-scheduled PMI which is correlated with the first co-scheduled PMI being reported with a second number of bits or not reported, and the second number being smaller than the first number.

In a sixth aspect of the present disclosure, there is provided a user equipment (UE) supporting multiple-user multi-input multi-output (MU-MIMO), comprising a reporting unit configured to report multiple-user channel quality indicator (MU-CQI) offset(s) corresponding to part of a plurality of co-scheduled precoding matrix indicators (PMI) configured by radio resource control (RRC) to an eNode B with a series of bits, wherein a first section of the series of bits indicating at least part of the co-scheduled PMI(s) for which the MU-CQI offset is reported, and a second section of the series of bits indicating the reported MU-CQI offset(s).

In a seventh aspect of the present disclosure, there is provided a wireless communication method based on multiple-user multi-input multi-output (MU-MIMO), comprising a step of receiving, by an eNode B, multiple-user channel quality indicator (MU-CQI) offsets corresponding to co-scheduled precoding matrix indicators (PMI) reported from a user equipment (UE), wherein a first MU-CQI offset corresponding to a first co-scheduled PMI which is fully orthogonal with a desired PMI being reported with a first number of bits, a second MU-CQI offset corresponding to a second co-scheduled PMI which is not fully orthogonal with the desired PMI being reported with a second number of bits, and the second number being smaller than the first number.

In a eighth aspect of the present disclosure, there is provided a wireless communication method based on multiple-user multi-input multi-output (MU-MIMO), comprising a step of receiving, by an eNode B, multiple-user channel quality indicator (MU-CQI) offsets corresponding to co-scheduled precoding matrix indicators (PMI) reported from a user equipment (UE), wherein a first MU-CQI offset corresponding to a first co-scheduled PMI being reported with a first number of bits, a second MU-CQI offset corresponding to a second co-scheduled PMI which is correlated with the first co-scheduled PMI being reported with a second number of bits or not reported, and the second number being smaller than the first number.

In a ninth aspect of the present disclosure, there is provided a wireless communication method based on multiple-user multi-input multi-output (MU-MIMO), comprising a step of receiving, by an eNode B, multiple-user channel quality indicator (MU-CQI) offset(s) corresponding to part of a plurality of co-scheduled precoding matrix indicators (PMI) configured by radio resource control (RRC) reported from a user equipment (UE) with a series of bits, wherein a first section of the series of bits indicating at least part of the co-scheduled PMI(s) for which the MU-CQI offset is reported, and a second section of the series of bits indicating the reported MU-CQI offset(s).

In a tenth aspect of the present disclosure, there is provided an eNode B supporting multiple-user multi-input multi-output (MU-MIMO), comprising a receiving unit configured to receive multiple-user channel quality indicator (MU-CQI) offsets corresponding to co-scheduled precoding matrix indicators (PMI) reported from a user equipment (UE), wherein a first MU-CQI offset corresponding to a first co-scheduled PMI which is fully orthogonal with a desired PMI being reported with a first number of bits, a second MU-CQI offset corresponding to a second co-scheduled PMI which is not fully orthogonal with the desired PMI being reported with a second number of bits, and the second number being smaller than the first number.

In a eleventh aspect of the present disclosure, there is provided an eNode B supporting multiple-user multi-input multi-output (MU-MIMO), comprising a receiving unit configured to receive multiple-user channel quality indicator (MU-CQI) offsets corresponding to co-scheduled precoding matrix indicators (PMI) reported from a user equipment (UE), wherein a first MU-CQI offset corresponding to a first co-scheduled PMI being reported with a first number of bits, a second MU-CQI offset corresponding to a second co-scheduled PMI which is correlated with the first co-scheduled PMI being reported with a second number of bits or not reported, and the second number being smaller than the first number.

In a twelfth aspect of the present disclosure, there is provided an eNode B supporting multiple-user multi-input multi-output (MU-MIMO), comprising a receiving unit configured to receive multiple-user channel quality indicator (MU-CQI) offset(s) corresponding to part of a plurality of co-scheduled precoding matrix indicators (PMI) configured by radio resource control (RRC) reported from a user equipment (UE) with a series of bits, wherein a first section of the series of bits indicating at least part of the co-scheduled PMI(s) for which the MU-CQI offset is reported, and a second section of the series of bits indicating the reported MU-CQI offset(s).

According to the above aspects of the present disclosure, the overhead for reporting MU CQI offsets can be reduced without losing performance too much.

The foregoing is a summary and thus contains, by necessity, simplifications, generalization, and omissions of details. Other aspects, features, and advantages of the devices and/or processes and/or other subject matters described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 2A illustrates an exemplary flowchart of the method for reporting MU-CQI offset according to the first embodiment and FIG. 2B illustrates an exemplary bit sequence;

FIG. 3 is a block diagram schematically showing a UE according to the first embodiment;

DETAILED DESCRIPTION

Figure 1:
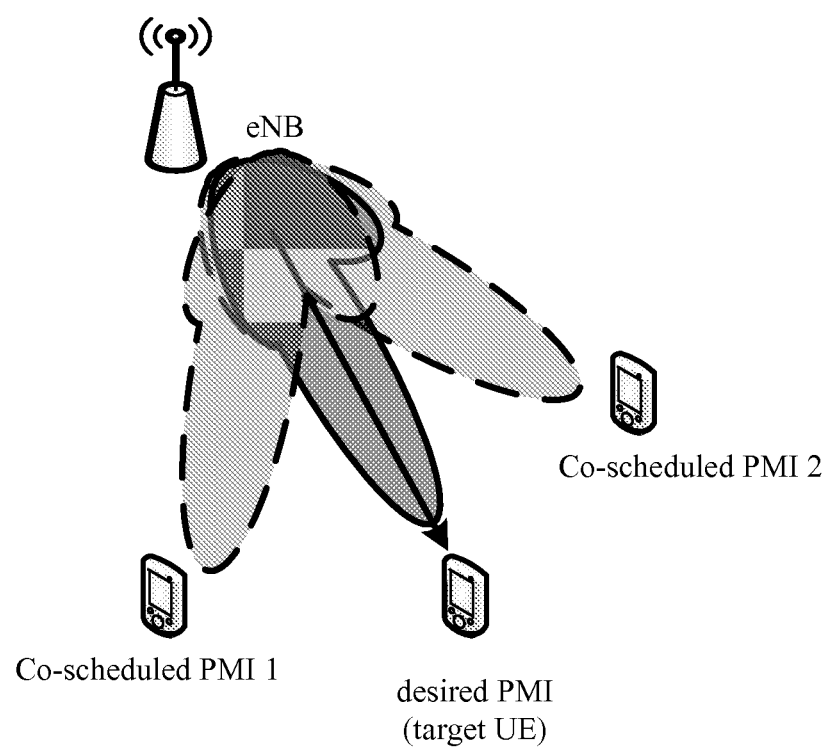
FIG. 1 illustrates an exemplary communication system supporting MU-MIMO for MU-CQI offset feedback.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

First Embodiment

In the current physical layer standard (Rel. 11), the codebooks can be split into several sets. The codebooks within the same set are fully orthogonal with each other, while the codebooks in different sets are not fully orthogonal. For example, based on codebooks in 4tx in the current physical layer standard, 16 codebooks can be split into four sets as shown in the following:

$CB_0=\{W_0,W_2,W_3\}$ $CB_1=\{W_4,W_5,W_6,W_7\}$
$CB_2=\{W_8,W_9,W_{10},W_{11}\}$ $CB_3=\{W_{12},W_{13},W_{14},W_{15}\}$.

The $CB_0$-$CB_3$ are four codebook sets, each of which contains four fully orthogonal codebooks. In this case, if the number of the co-scheduled PMIs is assumed to be 5 as described in Table 1, 6 codebooks should be selected, 1 for the desired PMI, and 5 for the 5 co-scheduled PMIs, resulting in that two co-scheduled PMIs must not belong to the same set with the others. In addition, the co-scheduled MU performance will be degraded if eNode B uses PMIs in different sets for MU-MIMO. Therefore, eNode B prefers to use PMIs in the same set for MU-MIMO. Especially when UE already feedbacks three CQI offsets for accurate PMIs, the possibility to select a PMI not in the same set to be used for an actual co-scheduled UE is relatively small. As a result, a coarse feedback for a CQI offset corresponding to a co-scheduled PMI not in the same set (fully orthogonal) with the desired PMI may be good enough. In other words, a MU-CQI offset corresponding to a co-scheduled PMI which is not fully orthogonal with the desired PMI can be reported with less number of bits (coarser) compared with a MU-CQI offset corresponding to a co-scheduled PMI which is fully orthogonal with the desired PMI. Here, the desired PMI is the best PMI that the target UE selects as described above.

In view of the above, at UE side, the first embodiment can be implemented as a wireless communication method based on multiple-user multi-input multi-output (MU-MIMO) as shown in FIG. 2A. The method 200 comprises a step 201 of reporting, by a UE (the target UE), multiple-user channel quality indicator (MU-CQI) offsets corresponding to co-scheduled precoding matrix indicators (PMI) to an eNode B. For the method 200, a first MU-CQI offset corresponding to a first co-scheduled PMI which is fully orthogonal with a desired PMI is reported with a first number of bits, a second MU-CQI offset corresponding to a second co-scheduled PMI which is not fully orthogonal with the desired PMI is reported with a second number of bits, and the second number is smaller than the first number. According to the method 200, not all the MU-CQI offsets are reported with the same number of bits. The CQI offset corresponding to the non-orthogonal co-scheduled PMI can be reported coarser with fewer bits while not reducing the communication performance too much since the non-orthogonal co-scheduled PMI is less likely to be actually selected by eNode B.

Preferably, in method 200, the first number can be 2, and the second number can be 1, as shown by the exemplary bit sequence of FIG. 2B. In other words, the first MU-CQI offset can be reported with 2 bits, and the second MU-CQI offset can be reported with 1 bit. Nevertheless, the first number is not limited to 2, but can also be any number larger than 2. Similarly, the second number is not limited to 1, but can be any number smaller than the first number.

As described above, the relationship between the value of the reported bits and the offset level of the MU-CQI offset (also simply referred to as MU-CQI offset) can be defined in a differential CQI table as Table 2. However, the Table 2 may not be suitable for the MU-CQI offset reporting since the MU-CQI with co-scheduled PMI should be smaller than the CQI for the desired PMI due to interference and power reduction and thus the MU-CQI offset should be generally negative. Table 3 is an exemplary modified table for MU-CQI offset.

TABLE 3

Modified MU-CQI offset table

| Subband differential CQI value | Offset level (dB) |
| --- | --- |
| 0 | 0 |
| 1 | −1 |
| 2 | −2 |
| 3 | ≤−3 |

In Table 3, the "Subband differential CQI value" corresponds to the value of the bits, and the "offset level" corresponds to the MU-CQI offset. It can be seen that the MU-CQI offset is generally negative, revealing the degradation of the MU-CQI relative to the CQI for the desired PMI. In this embodiment, the first number of bits, i.e. the bits for the first co-scheduled PMI, can be interpreted based on a MU-CQI offset table similar to Table 3. In other words, the relationship between the first MU-CQI offset and the first number of bits can be defined in a MU-CQI offset table (a first MU-CQI offset table). The MU-CQI offset table can be specified in the standard. It is noted that Table 3 is only an example, and other suitable tables can also be specified.

As for the interpretation of the second number of bits, i.e. the bit(s) for the second co-scheduled PMI, the relationship between the second MU-CQI offset and the second number of bits can be defined in second MU-CQI offset table, for example, the second MU-CQI offset table can be a subset of the first MU-CQI offset table. Taking Table 3 as an example, and assuming 1 bit for the second co-scheduled PMI, there are two values for the 1 bit, which are "0" or "1", and then the offset levels for the two values of the 1 bit can be specified for example by selecting from the offset levels in Table 3, that is, the offset levels for the two values of the 1 bit can be a subset of the offset levels in Table 3. For example, "0" could be "−2 dB", and "1" could be "≤−3". Table 4 shows an exemplary MU-CQI offset table for the second co-scheduled PMI. Table 4 can also be specified in the standard. Obviously, Table 4 is only an example, and the offset levels for the second co-scheduled PMI are limited to a subset of the offset levels for the first co-scheduled PMI. For example, "0" could be "−3 dB", and "1" could be "≤−4". Any suitable MU-CQI offset table can be specified for the second co-scheduled PMI.

TABLE 4

MU-CQI offset table for the second co-scheduled PMI

| Subband differential CQI value | Offset level (dB) |
| --- | --- |
| 0 | −2 |
| 1 | ≤−3 |

Alternatively, the bits for the second co-scheduled PMI can also indicate an offset to the best or worst MU-CQI offset among the first MU-CQI offsets being reported with the first number of bits. For example, in case of 1 bit for the second co-scheduled PMI, "0" can mean −2 dB offset relative to the worst first MU-CQI offset, and "1" can mean "≤−3 dB" offset relative to the worst first MU-CQI offset. Assuming the worst first MU-CQI offset is "−3 dB", then the second MU-CQI offset that "0" represents is "−3 dB"+"−2 dB"="−5 dB", the second MU-CQI offset that "1" represents is "−3 dB"+"≤−3 dB"="≤−6 dB". In this alternative, the bits for the second co-scheduled PMI represent a relative value, i.e. an offset to an first MU-CQI offset.

In the following, a specific example of the first embodiment is illustrated in connection with Table 5 to explain the concept and benefits of the first embodiment.

TABLE 5

Exemplary feedback of MU-CQI offset

| Desired PMI is PMI 0 | Co-scheduled PMI is PMI 1 MU-CQI offset 1 | Co-scheduled PMI is PMI 2 MU-CQI offset 2 | Co-scheduled PMI is PMI 3 MU-CQI offset 3 | Co-scheduled PMI is PMI 8 MU-CQI offset 4 | Co-scheduled PMI is PMI 10 MU-CQI offset 5 | Total bits |
|---|---|---|---|---|---|---|
| First Embodiment | 2 bits | 2 bits | 2 bit | 1 bit | 1 bit | 8 bits |
| Prior Art | 2 bits | 2 bits | 2 bit | 2 bit | 2 bit | 10 bits |

The example of Table 5 is based on the co-scheduled PMI assumptions of Table 1. Five co-scheduled PMIs are assumed. The desired PMI index is 0, and the co-scheduled PMIs are PMI 1, PMI 2, PMI 3, PMI 8 and PMI 10, among which PMI 1, PMI 2 and PMI 3 belong to the same set as PMI 0, i.e. are fully orthogonal with PMI 0, and PMI 8 and PMI 10 do not belong to the same set as PMI 0, i.e. are not fully orthogonal with PMI 0. According the prior art, for all the co-scheduled PMIs, 2 bits are needed each to report the MU-CQI offset, and therefore, 10 bits are needed in total. In contrast, according to the first embodiment of the present disclosure, for PMI 8 and PMI 10, only one bit is needed each to report the MU-CQI offset, and therefore, only 8 bits are needed in total. Compared to the prior art, 2 bits can be saved for each subband in this example according to the first embodiment of the present disclosure.

FIG. 3 is a block diagram illustrating a UE 300 according to the first embodiment of the present disclosure. The UE 300 supports multiple-user multi-input multi-output (MU-MIMO) and comprises a reporting unit 301 configured to report multiple-user channel quality indicator (MU-CQI) offsets corresponding to co-scheduled precoding matrix indicators (PMI) to an eNode B as described above in step 201, wherein a first MU-CQI offset corresponding to a first co-scheduled PMI which is fully orthogonal with a desired PMI is reported with a first number of bits, a second MU-CQI offset corresponding to a second co-scheduled PMI which is not fully orthogonal with the desired PMI is reported with a second number of bits, and the second number is smaller than the first number.

The UE 300 according to the present disclosure may optionally include a CPU (Central Processing Unit) 310 for executing related programs to process various data and control operations of respective units in the UE 300, a ROM (Read Only Memory) 313 for storing various programs required for performing various process and control by the CPU 310, a RAM (Random Access Memory) 315 for storing intermediate data temporarily produced in the procedure of process and control by the CPU 310, and/or a storage unit 317 for storing various programs, data and so on. The above reporting unit 301, CPU 310, ROM 313, RAM 315 and/or storage unit 317 etc. may be interconnected via data and/or command bus 320 and transfer signals between one another.

Respective units as described above do not limit the scope of the present disclosure. According to one implementation of the disclosure, the functions of the above reporting unit 301 may be implemented by hardware, and the above CPU 310, ROM 313, RAM 315 and/or storage unit 317 may not be necessary. Alternatively, the functions of the above reporting unit 301 may also be implemented by functional software in combination with the above CPU 310, ROM 313, RAM 315 and/or storage unit 317 etc.

Figure 4:
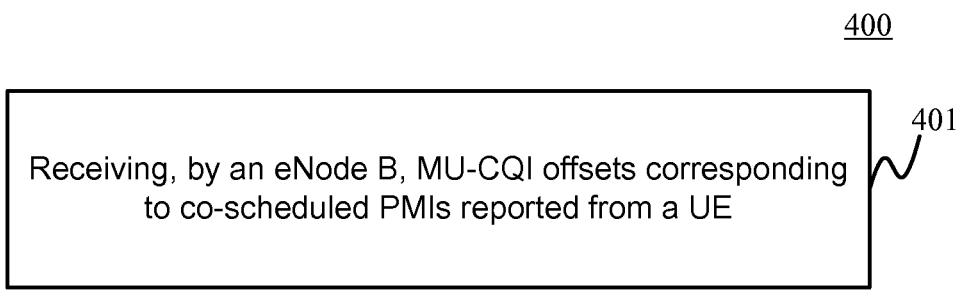
FIG. 4 illustrates an exemplary flowchart of the method for receiving MU-CQI offset according to the first embodiment.

Accordingly, at eNode B side, the first embodiment can be implemented as a wireless communication method 400 based on multiple-user multi-input multi-output (MU-MIMO) as shown in FIG. 4. The method 400 comprises a step 401 of receiving, by the eNode B, multiple-user channel quality indicator (MU-CQI) offsets corresponding to co-scheduled precoding matrix indicators (PMI) reported from a user equipment (UE), wherein a first MU-CQI offset corresponding to a first co-scheduled PMI which is fully orthogonal with a desired PMI is reported with a first number of bits, a second MU-CQI offset corresponding to a second co-scheduled PMI which is not fully orthogonal with the desired PMI is reported with a second number of bits, and the second number is smaller than the first number.

Figure 5:
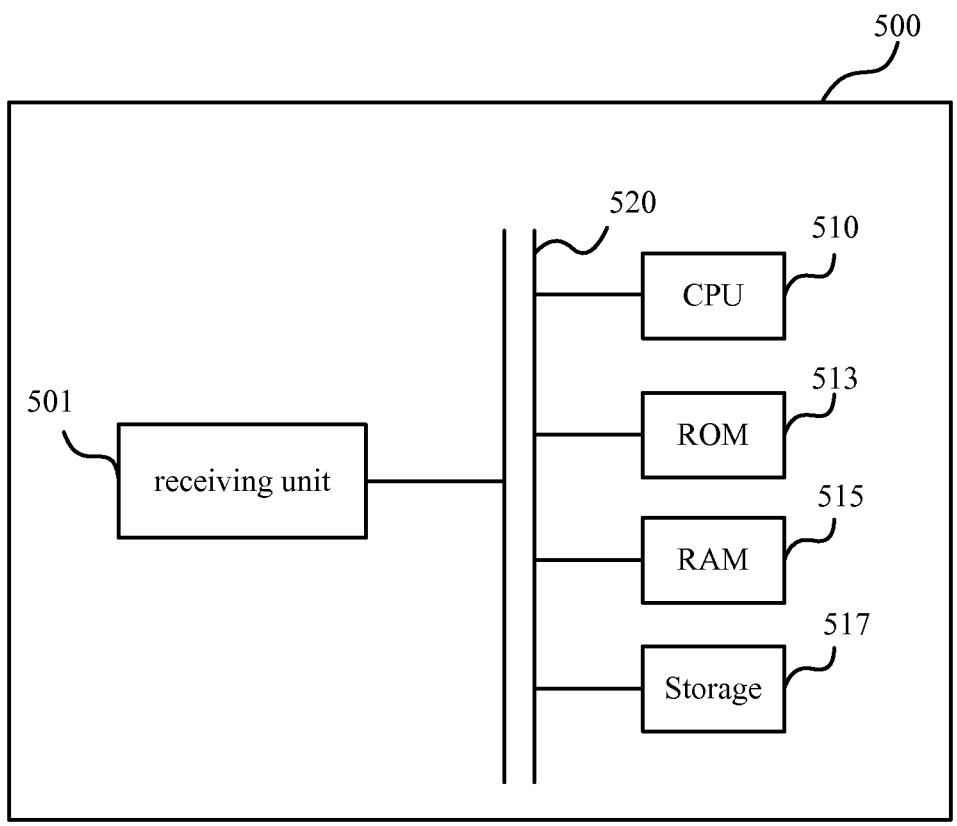
FIG. 5 is a block diagram schematically showing an eNode B according to the first embodiment.

FIG. 5 is a block diagram illustrating an eNode B 500 according to the first embodiment of the present disclosure. The eNode B 500 supports multiple-user multi-input multi-output (MU-MIMO) and comprises a receiving unit configured to receive multiple-user channel quality indicator (MU-CQI) offsets corresponding to co-scheduled precoding matrix indicators (PMI) reported from a user equipment (UE) as described above in step 401, wherein a first MU-CQI offset corresponding to a first co-scheduled PMI which is fully orthogonal with a desired PMI is reported with a first number of bits, a second MU-CQI offset corresponding to a second co-scheduled PMI which is not fully orthogonal with the desired PMI is reported with a second number of bits, and the second number is smaller than the first number.

The eNode B 500 according to the present disclosure may optionally include a CPU (Central Processing Unit) 510 for executing related programs to process various data and control operations of respective units in the eNode B 500, a ROM (Read Only Memory) 513 for storing various programs required for performing various process and control by the CPU 510, a RAM (Random Access Memory) 515 for storing intermediate data temporarily produced in the procedure of process and control by the CPU 510, and/or a storage unit 517 for storing various programs, data and so on. The above receiving unit 501, CPU 510, ROM 513, RAM 515 and/or storage unit 517 etc. may be interconnected via data and/or command bus 520 and transfer signals between one another.

Respective units as described above do not limit the scope of the present disclosure. According to one implementation of the disclosure, the functions of the above receiving unit 501 may be implemented by hardware, and the above CPU 510, ROM 513, RAM 515 and/or storage unit 517 may not be necessary. Alternatively, the functions of the above receiving unit 501 may also be implemented by functional software in combination with the above CPU 510, ROM 513, RAM 515 and/or storage unit 517 etc.

Second Embodiment

Figure 6:
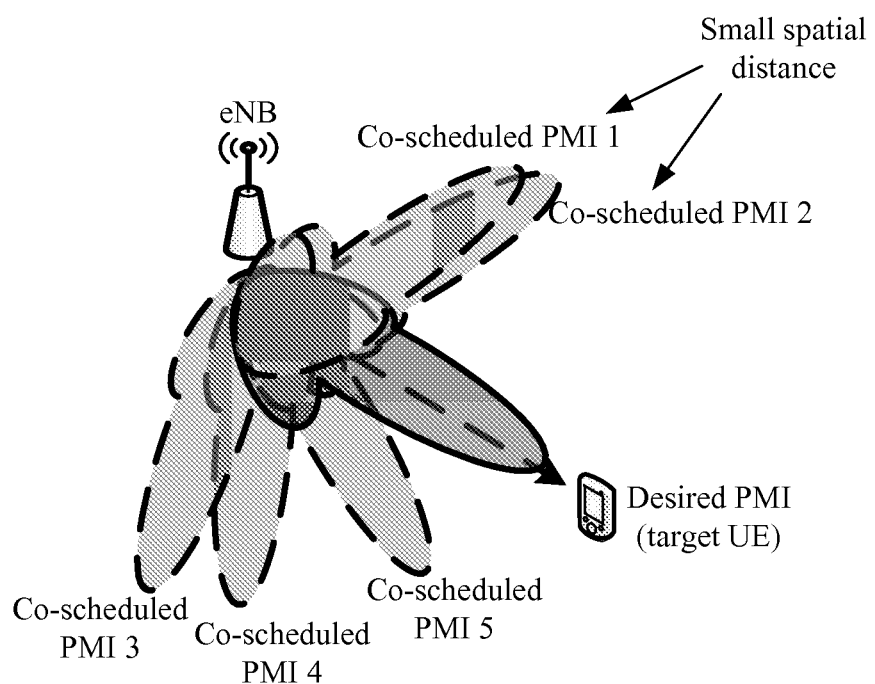
FIG. 6 illustrates an exemplary communication system for explaining the MU-CQI offset reporting according to the second embodiment.

Some co-scheduled PMIs may have small spatial distance or space, i.e. some co-scheduled PMIs are correlated, as shown in FIG. 6. FIG. 6 illustrates an exemplary communication system supporting MU-MIMO for MU-CQI offset feedback, in which there are five co-scheduled PMIs for the target UE. Among those co-scheduled PMIs, co-scheduled PMI 1 and PMI 2 have small spatial distance, i.e. they are correlated. Under this circumstance, it is not necessary to accurately feedback CQI offset for all the correlated co-scheduled PMIs. Only one of them may need to be reported accurately, and others correlated with the one reported accurately can be reported with fewer bits or even not be reported. In other words, a first MU-CQI offset corresponding to a first co-scheduled PMI can be reported with a first number of bits, and a second MU-CQI offset corresponding to a second co-scheduled PMI which is correlated with the first co-scheduled PMI can be reported with a second smaller number of bits or even not be reported. For example, for the case of FIG. 6, the co-scheduled PMI 1 can be reported with 2 bits, while the co-scheduled PMI 2 can be reported only with 1 bit or not be reported.

In view of the above, at UE side, the second embodiment can be implemented as a wireless communication method based on multiple-user multi-input multi-output (MU-MIMO). The method according to the second embodiment comprises a step, similar to step 201 shown FIG. 2, of reporting, by a UE, multiple-user channel quality indicator (MU-CQI) offsets corresponding to co-scheduled precoding matrix indicators (PMI) to an eNode B. However, in the second embodiment, a first MU-CQI offset corresponding to a first co-scheduled PMI is reported with a first number of bits, a second MU-CQI offset corresponding to a second co-scheduled PMI which is correlated with the first co-scheduled PMI is reported with a second number of bits or not reported, and the second number is smaller than the first number. In other words, according to the second embodiment, the MU-CQI offset corresponding to one (the first co-scheduled PMI) of the co-scheduled PMIs which are correlated (have small spatial distance or are expected to have similar degradation level) with each other is reported with a larger number of bits (e.g. 2 bits), and the MU-CQI offset corresponding to another (the second co-scheduled PMI) of the co-scheduled PMIs is reported with a smaller number of bits (e.g. 1 bit), or alternatively, the MU-CQI offset corresponding to the second co-scheduled PMI will not be reported.

As described in the first embodiment, the interpretation of the first number of bits for the first co-scheduled PMI can be defined in a MU-CQI offset table as Table 3, that is, the relationship between the first MU-CQI offset and the first number of bits can be defined in a MU-CQI offset table, which can be specified in the standard.

In the second embodiment, if the second MU-CQI offset is reported with the second number of bits, the second number of bits can indicate an offset to the first MU-CQI offset. For example, if the second number is 1, i.e. the second co-scheduled PMI is with 1 bit, then "0" can mean for example 1 dB offset relative to the first MU-CQI offset, and "1" can mean for example −1 dB offset relative to the first MU-CQI offset. Assuming the first MU-CQI offset is "−2 dB", then the second MU-CQI offset that "0" represents is "−2 dB"+"1 dB"="−1 dB", and the second MU-CQI offset that "1" represents is "−2 dB"+"−1 dB"="−3 dB". In addition, if the second MU-CQI offset is not reported, the second MU-CQI offset can be assumed to be the same as the first MU-CQI offset.

In the second embodiment, a co-scheduled PMI which is fully orthogonal with a desired PMI can be chosen as the first co-scheduled PMI, and the second co-scheduled PMI can be a co-scheduled PMI which is not fully orthogonal with the desired PMI. As described in the first embodiment, a coarse feedback for a CQI offset corresponding to a co-scheduled PMI not in the same set (fully orthogonal) with the desired PMI may be good enough. Therefore, in the second embodiment, the first co-scheduled PMI can preferably be a co-scheduled PMI which is fully orthogonal with a desired PMI, and thus be reported with more number of bits.

The UE according to the second embodiment which comprises a reporting unit has a similar configuration as UE 300 according to the first embodiment except the following. The reporting unit according to the second embodiment can be configured to report multiple-user channel quality indicator (MU-CQI) offsets corresponding to co-scheduled precoding matrix indicators (PMI) to an eNode B, wherein a first MU-CQI offset corresponding to a first co-scheduled PMI is reported with a first number of bits, a second MU-CQI offset corresponding to a second co-scheduled PMI which is correlated with the first co-scheduled PMI is reported with a second number of bits or not reported, and the second number is smaller than the first number.

Accordingly, at eNode B side, the second embodiment can be implemented as a wireless communication method based on multiple-user multi-input multi-output (MU-MIMO), The method according to the second embodiment comprises a step, similar to step 401 shown FIG. 4, of receiving, by the eNode B, multiple-user channel quality indicator (MU-CQI) offsets corresponding to co-scheduled precoding matrix indicators (PMI) reported from a user equipment (UE), wherein a first MU-CQI offset corresponding to a first co-scheduled PMI is reported with a first number of bits, a second MU-CQI offset corresponding to a second co-scheduled PMI which is correlated with the first co-scheduled PMI is reported with a second number of bits or not reported, and the second number is smaller than the first number.

The eNode B according to the second embodiment which comprises a receiving unit has a similar configuration as UE 500 according to the first embodiment except the following. The receiving unit according to the second embodiment can be configured to receive multiple-user channel quality indicator (MU-CQI) offsets corresponding to co-scheduled precoding matrix indicators (PMI) reported from a user equipment (UE), wherein a first MU-CQI offset corresponding to a first co-scheduled PMI is reported with a first number of bits, a second MU-CQI offset corresponding to a second co-scheduled PMI which is correlated with the first co-scheduled PMI is reported with a second number of bits or not reported, and the second number is smaller than the first number.

As seen from the above analysis, according to the second embodiment, the overhead for reporting MU CQI offsets can be reduced without losing performance too much.

Third Embodiment

The idea of the third embodiment is to report MU-CQI offsets for only part of the configured co-scheduled PMIs and indicate which PMI is reported by indication bits. The indication bits are used to guarantee the feedback accuracy since the eNode B can know which PMI is reported based on the indication bits. The MU-CQI offsets which are not reported can be calculated based on the reported MU-CQI offsets, for example, the MU-CQI offsets which are not reported can be calculated by averaging the reported MU-CQI offsets. When only one MU-CQI offset is reported, the "average" herein refers to the reported MU-CQI offset itself.

Figure 7:
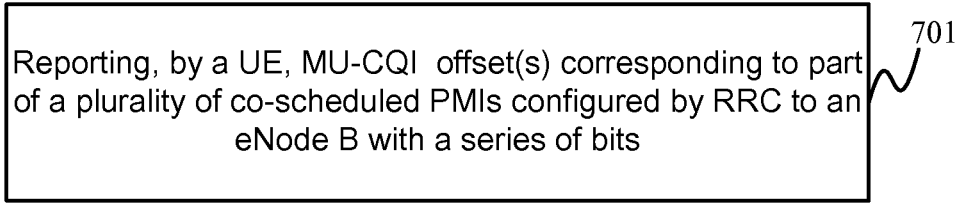
FIG. 7 illustrates an exemplary flowchart of the method for reporting MU-CQI offset according to the third embodiment.

In view of the above, at UE side, the third embodiment can be implemented as a wireless communication method 700 based on multiple-user multi-input multi-output (MU-MIMO) as shown in FIG. 7. The method 700 comprises a step 701 of reporting, by a UE, multiple-user channel quality indicator (MU-CQI) offset(s) corresponding to part of a plurality of co-scheduled precoding matrix indicators (PMI) configured by radio resource control (RRC) to an eNode B with a series of bits, wherein a first section (indication bits) of the series of bits indicates at least part of the co-scheduled PMI(s) for which the MU-CQI offset is reported, and a second section of the series of bits indicates the reported MU-CQI offset(s).

Herein, the plurality of co-scheduled PMIs configured by RRC can be as shown in Table 1. For example, when the desired PMI is PMI 0, the plurality of co-scheduled PMIs configured by RRC are PMI 1, PMI 2, PMI 3, PMI 8 and PMI 10. According to the third embodiment, the UE only reports the MU-CQI offset(s) for part of the configured co-scheduled PMIs. For example, in the example of Table 1 and assuming PMI 0 as the desired PMI, UE can only report MU-CQI offset(s) for PMI 1, or for PMI 2, or for PMI 1 and PMI 2, or for PMI 1, PMI 2, and PMI 3, but not for all the PMIs 1, 2, 3, 8 and 10. In addition, UE also informs the eNode B of which PMI is reported by adding indication bits (the first section) in the series of bits used to report the MU-CQI offset. In the series of bits, one section (the first section) is used to indicate which PMI is reported, i.e. to indicate the co-scheduled PMI(s) for which the MU-CQI offset is reported, and another section (the second section) is used to report (indicate) the reported MU-CQI offset(s). However, it may not be necessary to indicate all the co-scheduled PMIs that are reported. For example, if UE reports MU-CQI offsets for PMI 1 and PMI 2, the series of bits can indicate only PMI 1 or PMI 2, but not both PMI 1 and PMI 2 in the first section. Off course, both PMI 1 and PMI 2 can also be indicated. Therefore, the first section of the series of bits indicates at least part of the co-scheduled PMI(s) for which the MU-CQI offset is reported.

The MU-CQI offsets which are not reported can be calculated based on the reported MU-CQI offsets at eNode B side. Preferably, the MU-CQI offset not reported can be calculated by averaging the MU-CQI offsets which have been reported. It is noted that when only one MU-CQI offset is reported, the "average" here refers to the reported on MU-CQI offset itself.

Figure 8:
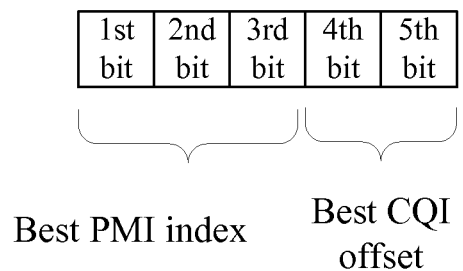
FIG. 8 schematically illustrates an exemplary bit series according to an example of the third embodiment, wherein the best MU-CQI offset is reported.

As a preferable example of the third embodiment, the best MU-CQI offset among the MU-CQI offsets corresponding to the plurality of co-scheduled PMIs configured by RRC and the indication of its corresponding co-scheduled PMI are reported with the series of bits. In this example, UE can report the best MU-CQI offset, and inform eNode B of which PMI corresponds to the best MU-CQI offset. An exemplary bit series according to this example is schematically illustrated in FIG. 8. In FIG. 8, the 1st to 3rd bits are used to indicate the PMI index corresponding to the best MU-CQI offset (best PMI index), and the 4th to 5th bits are used to report the best MU-CQI offset. The reason why 3 bits are chosen as indication bits is that this example is based on the configuration of Table 1. In Table 1, the number of possible co-scheduled PMIs for each desired PMI is 5, and thus the indication bits should be able to indicate at least 5 indexes. Therefore, 3 bits are used since 2 bits can only indicate 4 indexes. However, obviously, the number of indication bits can be modified depending on different number of possible co-scheduled PMIs. It is noted that, in this preferable example, the UE can only report the best MU-CQI offset, but alternatively, one or more other MU-CQI offsets can also be reported. This example does not limit whether other MU-CQI offsets are reported insofar as not all the MU-CQI offsets are reported.

In a specific case that the best MU-CQI offset is not better than the worst offset level defined in a MU-CQI offset table used for the reporting, only the best MU-CQI offset and the indication of its corresponding co-scheduled PMI are reported. Here, the MU-CQI offset table used for the reporting is a MU-CQI offset table as Table 3 used to interpret the bits idicating the MU-CQI offset. Taking Table 3 as example, if the best MU-CQI offset level is less than −3 dB which is the worst level defined in Table 3, then UE only reports the best MU-CQI offset and the indication of its corresponding co-scheduled PMI, and eNode B assumes other MU-CQI offset equals to the best MU-CQI offset.

Figure 9:
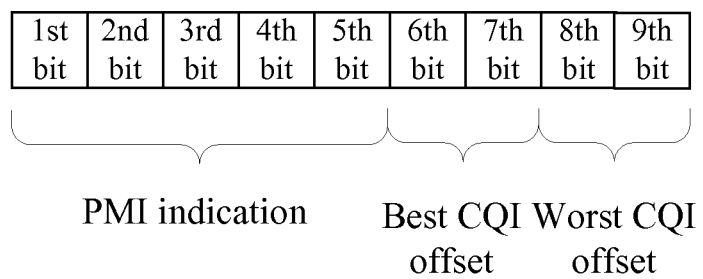
FIG. 9 schematically illustrates an exemplary bit series according to an example of the third embodiment, wherein the best MU-CQI offset and the worst MU-CQI offset are reported.

In another preferable example of the third embodiment, in addition to the best MU-CQI offset and the indication of its corresponding co-scheduled PMI, the worst MU-CQI offset among the MU-CQI offsets corresponding to the plurality of co-scheduled PMIs configured by RRC and the indication of its corresponding co-scheduled PMI are also reported with the series of bits. In this example, the best MU-CQI offset and the worse MU-CQI and the indication of the corresponding co-scheduled PMIs are reported. It is noted that the indication of the best co-scheduled PMI and the indication of the worst co-scheduled PMI are not necessarily reported separately, but can be reported jointly. FIG. 9 schematically illustrates an exemplary bit series according to this example, wherein the best MU-CQI offset and the worst MU-CQI offset are both reported. In FIG. 9, the 1st to 5th bits are used to indicate which two PMIs are corresponding to the best MU-CQI offset and the worst MU-CQI offset, the 6th to 7th bits are used to report the best MU-CQI offset, and the 8th to 9th bits are used to report the worst MU-CQI offset. Here, the indication of the best co-scheduled PMI and the indication of the worst co-scheduled PMI are jointly reported by 5 bits (PMI indication). The reason why 5 bits are used as indication bits is that this example is based on the configuration of Table 1. In Table 1, the number of possible co-scheduled PMIs for each desired PMI is 5, and thus the indication bits should be able to indicate at least 20 cases since choosing 1 PMI respectively for the best and the worst MU-CQI offset out of 5 PMIs results in 20 cases. Therefore, 5 bits are used since 4 bits can only indicate 16 cases. However, if the eNode B already knows (e.g., is informed by RRC signaling) which PMI is better, then only 4 bits may be enough to indicate the reported best and worst MU-CQI offsets since choosing 2 PMIs without order out of 5 PMIs results in 10 cases. In addition, obviously, the number of the indication bits can be modified depending on different number of possible co-scheduled PMIs. In the example of FIG. 9, only 9 bits are needed to perform the reporting, compared with the prior art as shown in Table 5, which needs 10 bits. The other MU-CQI offsets which are not reported can be averaged between the best MU-CQI offset and the worst MU-CQI offset.

Figure 10:
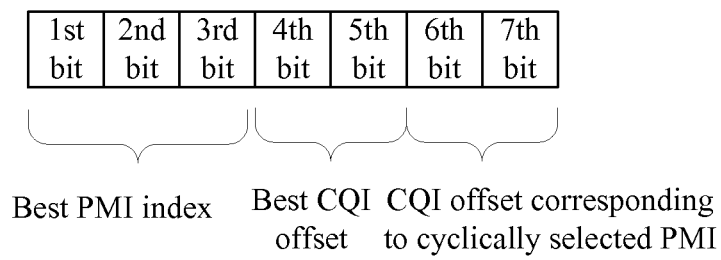
FIG. 10 schematically illustrates an exemplary bit series according to an example of the third embodiment, wherein the best MU-CQI offset and a MU-CQI offset corresponding to a cyclically selected co-scheduled PMI are reported.

In another preferable example of the third embodiment, in addition to the best MU-CQI offset and the indication of its corresponding co-scheduled PMI, a MU-CQI offset corresponding to a cyclically selected co-scheduled PMI other than the co-scheduled PMI related with the best MU-CQI offset is also reported with the series of bits. In this example, a MU-CQI offset corresponding to a cyclically selected co-scheduled PMI is reported instead of the worst MU-CQI offset, and the cyclically selected co-scheduled PMI cannot be the co-scheduled PMI related with the best MU-CQI offset. For example, in the example of Table 1 and assuming PMI 0 as the desired PMI, if the best co-scheduled PMI related with the best MU-CQI offset is PMI 1, then the cyclically selected co-scheduled PMI can be selected cyclically from {PMI 2, PMI 3, PMI 8, PMI 10}. In addition, in this example, the indication of the cyclically selected co-scheduled PMI may not be reported. FIG. 10 schematically illustrates an exemplary bit series according to this example, wherein the best MU-CQI offset and the MU-CQI offset corresponding to a cyclically selected co-scheduled PMI are reported. In FIG. 10, the 1st to 3th bits are used to indicate the PMI index corresponding to the best MU-CQI offset (best PMI index), the 4th to 5th bits are used to report the best MU-CQI offset, and the 6th to 7th bits are used to report the MU-CQI offset corresponding to a cyclically selected co-scheduled PMI are reported. The other MU-CQI offsets which are not reported can be averaged between the two reported MU-CQI offsets. The following Table 6 illustrates an exemplary way of cyclically selecting the cyclically selected co-scheduled PMI for subbands. In Table 6, different PMIs (PMI 2, PMI 3, PMI 8, PMI 10) are cyclically selected for different subbands (Subband 1, Subband 2, Subband 3, Subband 4, and so on).

TABLE 6 cyclically selected co-scheduled PMI for subbands

| | Subband 1 | Subband 2 | Subband 3 | Subband 4 | ... |
|---|---|---|---|---|---|
| Desired PMI is PMI 0 | Best CQI offset mapping PMI 1 | Best CQI offset mapping PMI 1 | Best CQI offset mapping PMI 1 | Best CQI offset mapping PMI 1 | |
| Cyclically selected co-scheduled PMI | PMI 2 | PMI 3 | PMI 8 | PMI 10 | |

In another preferable example of the third embodiment, in addition to the best MU-CQI offset and the indication of its corresponding co-scheduled PMI, a MU-CQI offset corresponding to a randomly selected co-scheduled PMI is also reported with the series of bits. This example differs from the last example only in that the MU-CQI offset corresponding to a randomly selected co-scheduled PMI is reported instead of the MU-CQI offset corresponding to a cyclically selected co-scheduled PMI.

The UE according to the third embodiment which comprises a reporting unit has a similar configuration as UE 300 according to the first embodiment except the following. The reporting unit according to the third embodiment can be configured to report multiple-user channel quality indicator (MU-CQI) offset(s) corresponding to part of a plurality of co-scheduled precoding matrix indicators (PMI) configured by radio resource control (RRC) to an eNode B with a series of bits, wherein a first section of the series of bits indicates at least part of the co-scheduled PMI(s) for which the MU-CQI offset is reported, and a second section of the series of bits indicates the reported MU-CQI offset(s).

Figure 11:
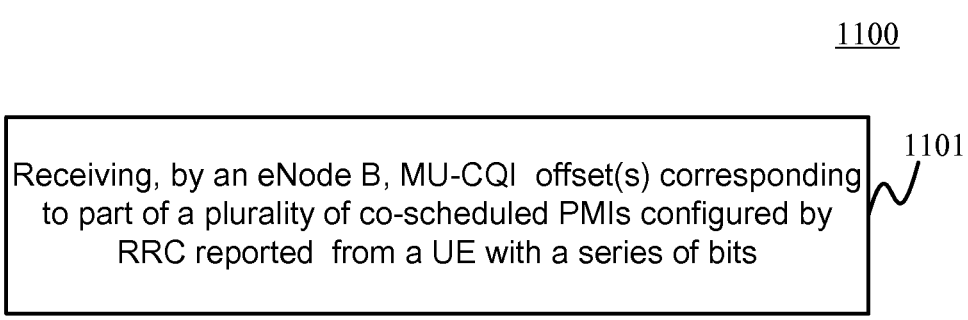
FIG. 11 illustrates an exemplary flowchart of the method for receiving MU-CQI offset according to the third embodiment.

Accordingly, at eNode B side, the third embodiment can be implemented as a wireless communication method 1100 based on multiple-user multi-input multi-output (MU-MIMO) as shown in FIG. 11. The method 1100 comprises a step 1101 of receiving, by the eNode B, multiple-user channel quality indicator (MU-CQI) offset(s) corresponding to part of a plurality of co-scheduled precoding matrix indicators (PMI) configured by radio resource control (RRC) reported from a user equipment (UE) with a series of bits, wherein a first section of the series of bits indicates at least part of the co-scheduled PMI(s) for which the MU-CQI offset is reported, and a second section of the series of bits indicates the reported MU-CQI offset(s).

The eNode B according to the third embodiment which comprises a receiving unit has a similar configuration as UE 500 according to the first embodiment except the following. The receiving unit according to the third embodiment can be configured to receive multiple-user channel quality indicator (MU-CQI) offset(s) corresponding to part of a plurality of co-scheduled precoding matrix indicators (PMI) configured by radio resource control (RRC) reported from a user equipment (UE) with a series of bits, wherein a first section of the series of bits indicates at least part of the co-scheduled PMI(s) for which the MU-CQI offset is reported, and a second section of the series of bits indicates the reported MU-CQI offset(s).

As seen from the above analysis, the third embodiment provides a compromise between performance and overhead, which can reduces the overhead for reporting MU-CQI offsets without losing performance too much.

(Alternatives)

In order to reduce the overhead for reporting MU-CQI offsets, there are two additional solutions. The first solution is to average all the MU-CQI offsets corresponding to all the possible co-sheduled PMIs at UE side and only report one averaged MU-CQI offset to the eNode B. The second solution is to only report the MU-CQI offset for the best co-scheduled PMI. The best co-scheduled PMI is one that leads to smallest degradation level (i.e. best MU-CQI offset). For the two solutions, the present disclosure also provides similar methods, UEs and eNode Bs as described above.

The present invention can be realized by software, hardware, or software in cooperation with hardware. Each functional block used in the description of each embodiment described above can be realized by an LSI as an integrated circuit. They may be individually formed as chips, or one chip may be formed so as to include a part or all of the functional blocks. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used. Further, the calculation of each functional block can be performed by using calculating means, for example, including a DSP or a CPU, and the processing step of each function may be recorded on a recording medium as a program for execution. Furthermore, when a technology for implementing an integrated circuit that substitutes the LSI appears in accordance with the advancement of the semiconductor technology or other derivative technologies, it is apparent that the functional block may be integrated by using such technologies.

It is noted that the present invention intends to be variously changed or modified by those skilled in the art based on the description presented in the specification and known technologies without departing from the content and the scope of the present invention, and such changes and applications fall within the scope that claimed to be protected. Furthermore, in a range not departing from the content of the invention, the constituent elements of the above-described embodiments may be arbitrarily combined.

What is claimed is:

1. A user equipment (UE) supporting multiple-user multi-input multi-output (MU-MIMO), comprising:
one or more memories; and
processing circuitry coupled to the one or more memories, wherein the processing circuitry, in operation, reports multiple-user channel quality indicator (MU-CQI) offsets corresponding to co-scheduled precoding matrix indicators (PMI) to an eNode B, wherein
a first MU-CQI offset corresponding to a first co-scheduled PMI is reported with a first number of bits,
a second MU-CQI offset corresponding to a second co-scheduled PMI which is correlated with the first co-scheduled PMI is reported with a second number of bits or not reported, and
the second number is smaller than the first number.

2. The user equipment according to claim 1, wherein the first number is 2, and
the second number is 1.

3. A user equipment (UE) supporting multiple-user multi-input multi-output (MU-MIMO), comprising:
one or more memories; and
processing circuitry coupled to the one or more memories, wherein the processing circuitry, in operation, reports a multiple-user channel quality indicator (MU-CQI) offset corresponding to one of a plurality of co-scheduled precoding matrix indicators (PMI) configured by radio resource control (RRC) to an eNode B with a series of bits; wherein
a first section of the series of bits indicates one of the co-scheduled PMIs for which the MU-CQI offset is reported;
a second section of the series of bits indicates the reported MU-CQI offset; and
a best MU-CQI offset among the MU-CQI offsets corresponding to the plurality of co-scheduled PMIs configured by RRC and the indication of its corresponding co-scheduled PMI are reported with the series of bits.

4. The user equipment according to claim 3, wherein the worst MU-CQI offset among the MU-CQI offsets corresponding to the plurality of co-scheduled PMIs configured by RRC and the indication of its corresponding co-scheduled PMI are also reported with the series of bits.

5. The user equipment according to claim 3, wherein a MU-CQI offset corresponding to a randomly selected co-scheduled PMI is also reported with the series of bits.

6. The user equipment according to claim 3, wherein a MU-CQI offset corresponding to a cyclically selected co-scheduled PMI other than the co-scheduled PMI corresponding to the best MU-CQI offset is also reported with the series of bits.

7. The user equipment according to claim 6, wherein the cyclically selected co-scheduled PMI is cyclically selected for subbands.

8. The user equipment according to claim 3, wherein only the best MU-CQI offset and the indication of its corresponding co-scheduled PMI are reported if the best MU-CQI offset is not larger than the worst offset level defined in a MU-CQI offset table used for the reporting.

9. An eNode B supporting multiple-user multi-input multi-output (MU-MIMO), comprising:
one or more memories; and
processing circuitry coupled to the one or more memories, wherein the processing circuitry, in operation, controls reception of multiple-user channel quality indicator (MU-CQI) offsets corresponding to co-scheduled precoding matrix indicators (PMI) reported from a user equipment (UE), wherein
a first MU-CQI offset corresponding to a first co-scheduled PMI is reported with a first number of bits,
a second MU-CQI offset corresponding to a second co-scheduled PMI which is correlated with the first co-scheduled PMI is reported with a second number of bits or not reported, and
the second number is smaller than the first number.

10. An eNode B supporting multiple-user multi-input multi-output (MU-MIMO), comprising:
one or more memories; and
processing circuitry coupled to the one or more memories, wherein the processing circuitry, in operation, controls reception of a multiple-user channel quality indicator (MU-CQI) offset corresponding to one or a plurality of co-scheduled precoding matrix indicators (PMI) configured by radio resource control (RRC) reported from a user equipment with a series of bits, wherein
a first section of the series of bits indicates one of the co-scheduled PMIs for which the MU-CQI offset is reported;
a second section of the series of bits indicates the reported MU-CQI offset; and
a best MU-CQI offset among the MU-CQI offsets corresponding to the co-scheduled PMIs configured by RRC and the indication of its corresponding co-scheduled PMI are reported with the series of bits.

11. The eNode B according to claim 10, wherein the worst MU-CQI offset among the MU-CQI offsets corresponding to the co-scheduled PMIs configured by RRC and the indication of its corresponding co-scheduled PMI are also reported with the series of bits.

12. The eNode B according to claim 10, wherein a MU-CQI offset corresponding to a randomly selected co-scheduled PMI is also reported with the series of bits.

13. The eNode B according to claim 10, wherein a MU-CQI offset corresponding to a cyclically selected co-scheduled PMI other than the co-scheduled PMI corresponding to the best MU-CQI offset is also reported with the series of bits.

14. The eNode B according to claim 13, wherein the cyclically selected co-scheduled PMI is cyclically selected for subbands.

15. The eNode B according to claim 10, wherein only the best MU-CQI offset and the indication of its corresponding co-scheduled PMI are reported if the best MU-CQI offset is not larger than the worst offset level defined in a MU-CQI offset table used for the reporting.

* * * * *